United States Patent Office

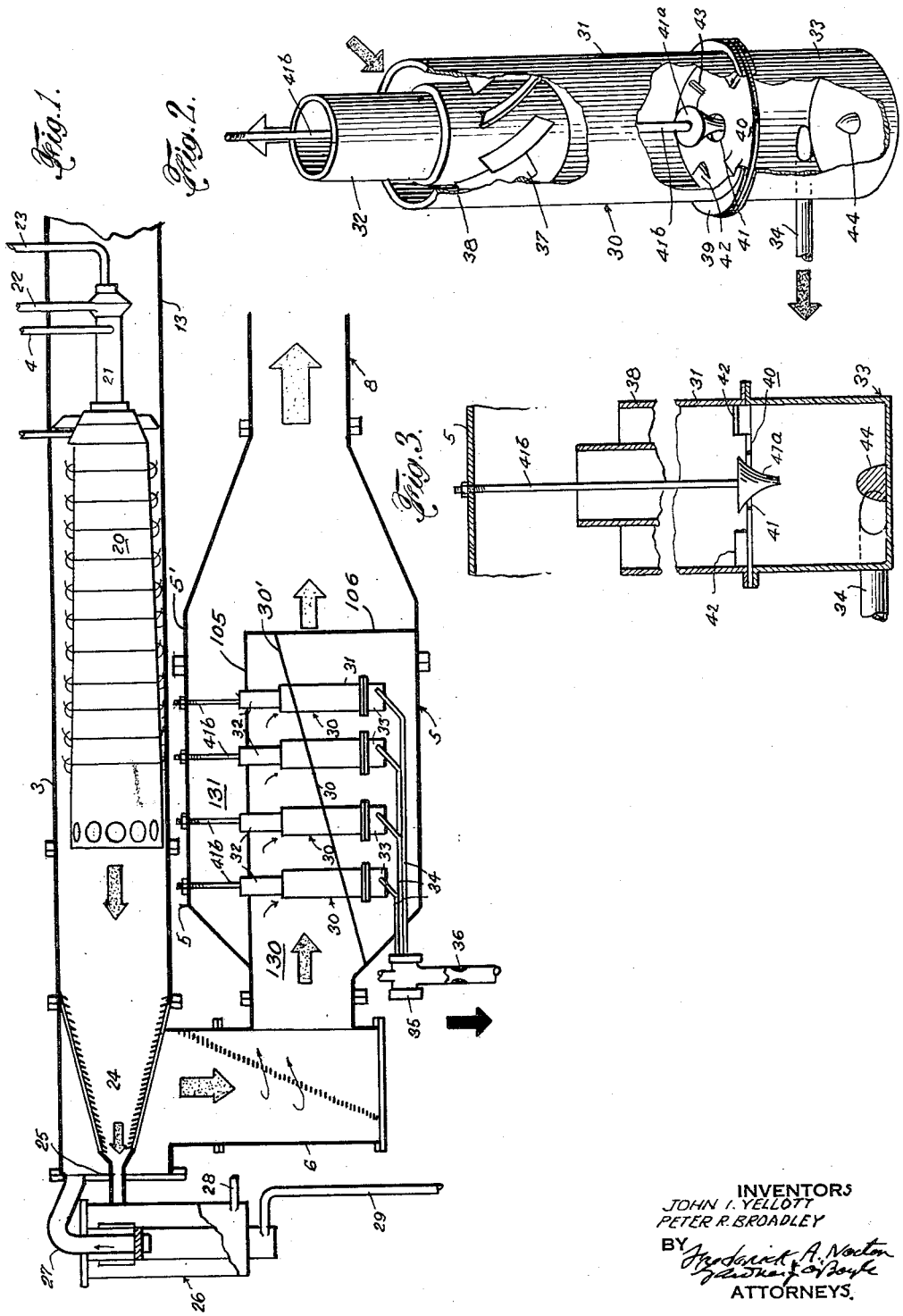

2,804,171
Patented Aug. 27, 1957

---

2,804,171

COMBINATION REVERSE FLOW VORTICAL WHIRL SEPARATOR AND CLASSIFIER

John I. Yellott, New York, N. Y., and Peter R. Broadley, Elizabeth, N. J., assignors to Bituminous Coal Research, Inc., Washington, D. C., a corporation of Delaware Original application November 23, 1951, Serial No. 257,702. Divided and this application February 7, 1955, Serial No. 486,557

3 Claims. (Cl. 183—92)

This invention relates to a combination reverse flow vortical whirl separator and classifier, and, more particularly, to relatively small pressure-sustaining units attached for use in ash removal equipment of pressurized combustion systems, using powdered coal, such, for example, as may be used in locomotives powered by coal-fired gas turbine power plants.

This application is a division of our prior application Serial No. 257,702, filed November 23, 1951, for Vortical Whirl Separators and Method of Operation.

In our said application the functional factors covering separation of solids from entraining gases as determined by studies made with full scale equipment, were carefully set up.

A feature of our said invention was the discovery of th efficiency of the combination of a discharge chamber, functioning as a secondary separator, with a tangential blowdown line located at the intersection of the side wall and the flat bottom of the discharge chamber. Optimum operating characteristics were found as the result of establishing the proper dimensional ratios between the several parts of the device. Thus, the length of the primary separator section or barrel should be twice its diameter; the discharge or secondary collection chamber should be one-half the length of the barrel; the breather hole in the axially apertured diaphragm or razor plate should be about one-tenth the diameter of the tube; while the diameter of the blow-down line should approximate one-half the diameter of the breather hole. Translated into actual structure, it is noted that a 10-inch diameter tube should have a 20-inch barrel, a 10-inch long discharge or secondary collection chamber, a 1-inch breather hole in the razor plate, skimmer blades 1.5 inches wide, and a blowdown pipe .75 inch inside diameter. The spinner vanes should have an outlet angle of 30°, and be contained in a collar or annulus 5.75-inches wide. The breather hole should have no collars.

Reverse flow vortical whirl separator tubes, having the dimensions listed immediately above, are eminently practical, and give good collection efficiency as the air flow is raised from 500 to 1100 cubic feet per minute (C. F. M.). A small additional increase results when the flow is raised to 1500 C. F. M. per tube, and this added protection to the turbine blades is worth while. The novel vortical whirl separators herein are relatively insensitive to the amount of air discharged through the blowdown pipes. A 1.5% blowdown (22 C. F. M. per tube) gives good efficiency at an airflow of 1500 C. F. M.

The mechanics of separation of particulate solids and fluid droplets from entraining gaseous fluid streams, particularly at pressures of the order of 50–100 p. s. i. and airflow speeds of 600–200 C. F. M., are not too well known, and the published articles on the subject have been more often conjectural than factual. This is particularly true of small size vortical whirl separators having a spinning entrant stream with a rectilinear discharge of separated particles and 180° complete reversal of flow of the cleaned fluid. By placing a razor plate having a central breather or return hole at the base of the barrel of a separator, so that discharge of skimmed-off solids into a subjacent separator is permitted, the relatively fine undischarged particles are continuously recirculated in the secondary separator in a vortical stream.

Another fact of considerable importance was the discovery that by placing a deflector plug in the axial opening of the diaphragm to restrict the area thereof, the secondary chamber of the separator will serve as a classifier.

As this application is specifically concerned with the details of the novel classifier, and its action in the separators, the general details of the separators and their special separating action, will not be considered further herein, as they are well described and claimed in the parent application.

It is therefore among the features of novelty and advantage of the present invention to provide novel reverse flow vortical whirl separators, incorporating adjustable classifiers, and methods of operating same, for separating particulate materials from entraining gaseous fluids, the separated material being removed in blowdown streams comprising a minute fraction of the original gasiform fluids.

Another feature of novelty and advantage of the invention herein includes such separators having primary and secondary separator chambers with axially apertured diaphragms having peripheral skimmer blades, and adjustable plug members fitting in the axial aperture whereby the separators are also adapted to function as classifiers.

A further feature of novelty and advantage of the invention herein resides in the combination of a separator battery, of classifying, reverse flow vortical whirl separations, in combustion apparatus for the pressurized combustion of powdered coal.

With these and other features of novelty and advantage in view, which may be incident to the improvements herein, the invention consists in the parts and combinations to be hereinafter set forth and claimed, with the understanding that the several necessary elements comprising the invention, may be varied in construction, proportions and arrangements, as well as in mode of operation, without departing from the spirit and scope of the appended claims.

In order to make the invention more clearly understood, there is shown in the accompanying drawings means for carrying the same into practical effect, without limiting the improvements in their useful application to the particular constructions, which, for the purpose of explanation, have been made the subject of illustration.

In the drawings, like numerals refer to similar parts throughout the several views, of which Figure 1 is a schematic showing of a combustor and ash separating elements of a pressurized powdered coal-burning power plant, with a combustor, burner, and individual classifying reverse flow vortical whirl ash separators shown in elevation, Fig. 2 is an elevation, partly in broken section, of a vortical whirl separator having a spinner inlet, an axial cleaned air outlet, a primary separator chamber, and a secondary separator or discharge chamber with a tangential blowdown line, together with an intermediate diaphragm incorporating an axial breather hole and peripheral skimmer blades, together with an adjustable plug spacedly fitted in the breather hole, and Fig. 3 is a fragmentary detail, in vertical section, showing the mounting of a classifier plug of Fig. 2 on a hanger rod adjustably mounted on the ash separator casing.

Turning now to the drawings, and, more particularly, to Fig. 1, there is shown a unitary combustor and ash separating system incorporating the novel classifying reverse flow vortical whirl separators of the present invention. The combustion system incorporates at least one cold wall combustor 3, with a feed line for supplying pressurized air-borne powdered coal from a suitable supply, all as described in our parent application hereinabove identified. Motive fluid generated by the admixture of cold air with the products of combustion is discharged from the combustor to ash separator 5 through ducts 6. Cleaned motive fluid is delivered to the usual use device, such as an expansion engine or turbine, not shown, through expansion ducts 8. The spent motive fluid is vented to the atmosphere in any suitable manner. As is usual in such systems, the secondary diluting and cooling air is supplied from a separate source power, driven by a turbine, and delivers air to the combustor through expansion duct 13. The combustor 3, as noted, will be seen to comprise a housing, a cold wall combustion chamber 20, and combination burner 21, having a coal-air feed line 4, and oil inlet and outlet lines 22, 23. The burner is more specifically described and claimed in the companion application of Paul M. Rotzler, Serial No. 257,079, filed Nov. 19, 1951, for Powdered Coal Burner for Pressurized Combustors.

In one form of the invention, as shown, cooling air from duct 13 flows over the outer and inner walls of the combustor chamber and mixes with the hot combustion gases, the resulting ash-bearing motive fluid being discharged through apical louver separator 24 and duct 6 to the fly ash separator assembly 5. The apical separator has an axial discharge line 25 to a coarse ash reducer and vortical whirl separator, designated generally by the numeral 26, and more particularly disclosed and claimed in the Patent 2,652,792 of Sept. 22, 1953, issued to John I. Yellott, for Pressurized Combustion and Ash Removal System for Coal-Fired Gas Turbine Power Plant.

Cleaned gas from the separator is returned to the motive fluid stream through goose neck 27. An air jet is supplied by air line 28, and a blowdown line 29 serves to remove the reduced ash and uncombusted, quenched solids from the separator 26.

The fine ash-bearing motive fluid is delivered to the ash separator assembly 5, wherein the ash is removed by passage through a battery of reverse flow vortical whirl separator tubes, severally designated by the numeral 30, the cleaned motive fluid discharging to a turbine through duct 8. The casing 5', having an internal horizontal wall 105, and an internal vertical wall 106, is provided with an apertured slope sheet or plate 30', through which the separator tubes 30 extend. It will be noted that the slope sheet 30' is diagonally disposed within the casing 5', as shown, and that it forms with wall 105 a dirty gas input plenum chamber 130, the wall 105 also forming a cleaned gas output plenum chamber 131 with the casing 5'. The individual vortical whirl separator tubes 30, as shown more in detail in Fig. 2, have barrel sections 31 mounting reverse flow axial cleaned air discharge tubes 32. Secondary separation or discharge chambers 33 are secured to the bases of the barrel sections, diaphragm or razor plates 40 being secured therebetween. The secondary chambers 33 are provided with separate pneumatic discharge means for separated ash, comprising blowdown lines 34 discharging to blowdown manifold 35, from whence the ash is pneumatically purged from the system through critical flow nozzle 36, whereby there is a uniform pressure maintained in the separators, with no blowback therebetween due to differential discharge pressures in the blowdown lines.

The spinner type inlet separators herein, as shown in Fig. 2, have a plurality of deflector vanes 37 mounted on an annulus 38 which is fitted over the axial cleaned air discharge tube 32, and maintains the vanes 37 in place in the mouth of barrel sections 31. Usually the vanes are mounted to present an exit or discharge angle of 30°.

The barrels 31 and discharge chambers 33 may be flanged, as indicated generally at 39, to receive the razor plates 40. These members have a central aperture 41, and a plurality of peripheral, upstruck blades or skimmers 42, defining discharge apertures 43 leading from the primary separation chamber in barrel 31 to the secondary separation or discharge chamber 33. The blades are preferably sharpened, and may have any suitable shape, such as spoon or scoop, and can be oriented in any manner found desirable to effect the maximum separation of particulate material from the primary gasiform fluid stream which is projected against the skimmer plate as a helically advancing sheath stream in contact with the inner wall of the primary barrel or separator chamber. The blades 42 are usually two or four in number, and no significant difference in results is observable between them. The pneumatic blowdown lines 34, as shown, may be tangential to the walls of the chambers 33 and at the base thereof. Because of the tight vortex action of the secondary cleaned air, there is an appreciable erosion or abrasion of the bases of the chambers 33, at the axes thereof, and wear members, such as conical wear member 44, may be mounted at such axes to eliminate or mitigate this condition. While the invention comprehends the use of fixed wear members, it will be understood that spinning or rotatable members may be used without departing from the spirit and scope of the invention.

The reverse flow vortical whirl separators herein are adapted to co-function as classifiers by utilizing a valve member 41a adjustably disposed in aperture 41 of the diaphragm 40, as illustrated in Figs. 2 and 3. The valve member can be mounted on the end of a spindle 41b, which can be adjustably secured to the top wall of ash separator housing 5, as shown. By varying the effective area of the breather hole 41, according to the operating pressure of the system, the secondary or discharge chambers of the novel vortical whirl separators herein can be made to function as classifiers, and the particle size of particulate material asported axially from the secondary chamber through the axially apertured breather hole into the primary separator chamber can be controlled, as desired. The modus operandi of this classifying action is not understood, but is assumed to be due to the imposition of a back pressure on the discharge chamber, as a function of the area of the breather hole. By flaring the top of the plug 41a, as shown in Fig. 3, the particle-laden gasiform fluid discharged through breather hole 41 is directed radially outward, in a vortical whirl, and the contained particles are whirled outward, in the plane of the skimmer blades 42, and returned to the discharge chamber, to be asported and continuously removed in the blowdown stream.

The incorporation of the pneumatic discharge blowdown principle in the novel reverse flow vortical whirl separators herein permits the handling of particle-containing, high pressure and high temperature (1300° F.), gas streams, and the removal of the contained particles from the separators by utilizing from 1 to 10% of the gas stream as a blowdown stream, thereby eliminating mechanical ash removing equipment from the system. The vortical whirl separators herein are capable of functioning as self-sustaining pressure vessels, thereby permitting their use in locomotive power plants, where appreciable and important reductions in size and weight of ash removal equipment can be effected, all as more particularly set out and claimed in our companion application Serial No. 330,077, filed January 7, 1953, for Coal-Burning Gas Turbine Power Plants Incorporating Novel Self-Supporting, and Pressure-Sustaining Vortical Whirl Separators Together With Improved Ash Quenching and Blowdown Means.

It will be readily apparent that the improved reverse flow vortical whirl separators herein are susceptible of use in a wide variety of industrial and technical installations, a preferred use being the continuous separation and pneumatic removal of combustion residues resulting from the pressurized combustion of pulverized coal in the generation of high temperature motive fluid for gas turbines. A notable characteristic of systems incorporating the novel separators herein is the fact that removal of separated solids in and by a pneumatic disposal system is accomplished by the use of fractional amounts of the carrier fluid for asporting such solids in blowdown streams, thereby eliminating the usual mechanical removal equipment. Where high temperatures are involved, as in combustion systems, the invention comprehends the use of auxiliary coolant gasiform fluid streams, co-flowing in enveloping relation to the self-purging, heated particle-bearing streams, to receive, quench, asport and pneumatically discharge the separated particles, whereby the hot cleaned gas is separately removed to a use device substantially in its original volume and without appreciable lowering in temperature. The method of operation of the novel devices herein will be susceptible of many variations, as is evident from a study of the specification and drawings.

There has been described and illustrated a device capable of performing all of the specifically mentioned objects of this invention as well as others which are apparent to those skilled in the art. Various uses of the present invention may be made employing the described structure. Accordingly, it is apparent that variations as to operation, size and shape, and rearrangement of elements may be made without departing from the spirit of the invention. Accordingly, limitation is sought only in accordance with the scope of the following claims.

What is claimed is:

1. An ash separator battery of the character described, including, in combination, an ash separator casing having an internal horizontal wall and internal vertical wall, an apertured sloped plate extending the length of the casing and forming with said internal walls a lower dirty gas input plenum chamber, an upper cleaned gas output plenum chamber between said internal walls and the outer wall of the separator casing, a source of solid bearing gases coupled to the inlet side of the bottom chamber; a discharge for cleaned gas coupled to the outlet side of the upper chamber; a battery of reverse flow vortical whirl separators mounted in the ash separator each said separators comprising primary and secondary separator chambers; an axial apertured diaphragm skimmer plate between said chambers and incorporating peripheral openings defined by upstruck skimmer plates whereby peripheral and axial fluid connection is established between said chambers; spin-imparting inlet means in the mouth of each separator and establishing fluid communication with the input plenum chamber; a cleaned gas outlet tube axially mounted in the mouth of each separator, and discharging into the cleaned gas output plenum chamber; a tangential blowdown line at the base of each secondary chamber; a blowdown manifold receiving the separated ash from the separators through the blowdown lines, concentrated separated ash blowdown means including a second blowdown line incorporating a flow restrictor, and adjustable plug means mounted on the separator casing and depending into the cleaned gas outlet tubes of each separator; each said plug means fitted into the axial opening of the co-acting diaphragm to variably restrict the area thereof, whereby the secondary chamber of each separator serves as a classifier.

2. A vortical whirl separator of the character described, comprising in combination, a primary separator chamber having a cleaned gas discharge tube axially mounted in the mouth thereof, a secondary separator secured to the bottom of said primary chamber, an axially apertured skimmer plate between the chambers, said plate incorporating an axial opening, and peripheral openings defined by upstruck skimmer blades, whereby axial and peripheral fluid communication is established between said chambers, a tangential blowdown line at the base of the secondary chamber, and means to variably restrict the area of the axial opening in the skimmer plate comprising an inverted conical shaped plug fitted into the opening and adjustably supported above the plate, whereby the secondary separator chamber serves as a classifier.

3. An ash separator of the character described, including, in combination, an ash separator casing having an internal horizontal wall and an internal vertical wall, an apertured sloped plate extending lengthwise of the casing and forming with said internal walls a lower dirty gas input plenum chamber, and an upper cleaned gas output plenum chamber between said internal walls and the outer wall of the separator casing, a source of solid-bearing gases coupled to the inlet side of the bottom chamber, a discharge for cleaned gas coupled to the outlet side of the upper chamber, a battery of reverse flow vortical whirl separators mounted in the ash separator, each of said separators comprising a primary separator chamber having a cleaned gas discharge tube axially mounted in the mouth thereof and discharging into the cleaned gas output plenum chamber, a secondary separator secured to the bottom of said primary chamber, an axially apertured skimmer plate between the chambers, said plate incorporating an axial opening, and peripheral openings defined by upstruck skimmer blades, whereby axial and peripheral fluid communication is established between said chambers, a tangential blowdown line at the base of the secondary chamber, a blowdown manifold receiving the separated ash from the separators through the blowdown lines, and means to restrict the area of the axial opening in the skimmer plate comprising an inverted conical shaped plug adjustably mounted on the separator casing and depending into the cleaned gas outlet tube of the primary separator chamber, said plug fitting into the axial opening of the co-acting diaphragm plate to variably restrict the area thereof, whereby the secondary chamber of each separator serves as a classifier.

References Cited in the file of this patent

UNITED STATES PATENTS

| | | |
|---|---|---|
| 418,836 | Allington | Jan. 7, 1890 |
| 769,808 | Venderbush et al. | Sept. 13, 1904 |
| 1,761,627 | Hine | June 3, 1930 |
| 2,451,755 | Lee | Oct. 19, 1938 |
| 2,582,423 | Foley | Jan. 15, 1952 |
| 2,681,124 | Van der Kolk | June 15, 1954 |

FOREIGN PATENTS

| | | |
|---|---|---|
| 947,478 | France | Jan. 10, 1949 |